Oct. 27, 1964 M. A. RAKHA ETAL 3,154,639

COMPENSATING DIODE FOR COMPLEMENTARY SYMMETRY CIRCUIT

Filed July 28, 1961

INVENTORS
Mohammed A. Rakha
Joseph F. Yello
BY James T. Barr
Atty.

United States Patent Office 3,154,639
Patented Oct. 27, 1964

3,154,639

COMPENSATING DIODE FOR COMPLEMENTARY SYMMETRY CIRCUIT

Mohammed A. Rakha and Joseph F. Yello, Chicago, Ill., assignors to Admiral Corporation, Chicago, Ill., a corporation of Delaware Filed July 28, 1961, Ser. No. 127,703
3 Claims. (Cl. 179—1)

Figures 1, 2:
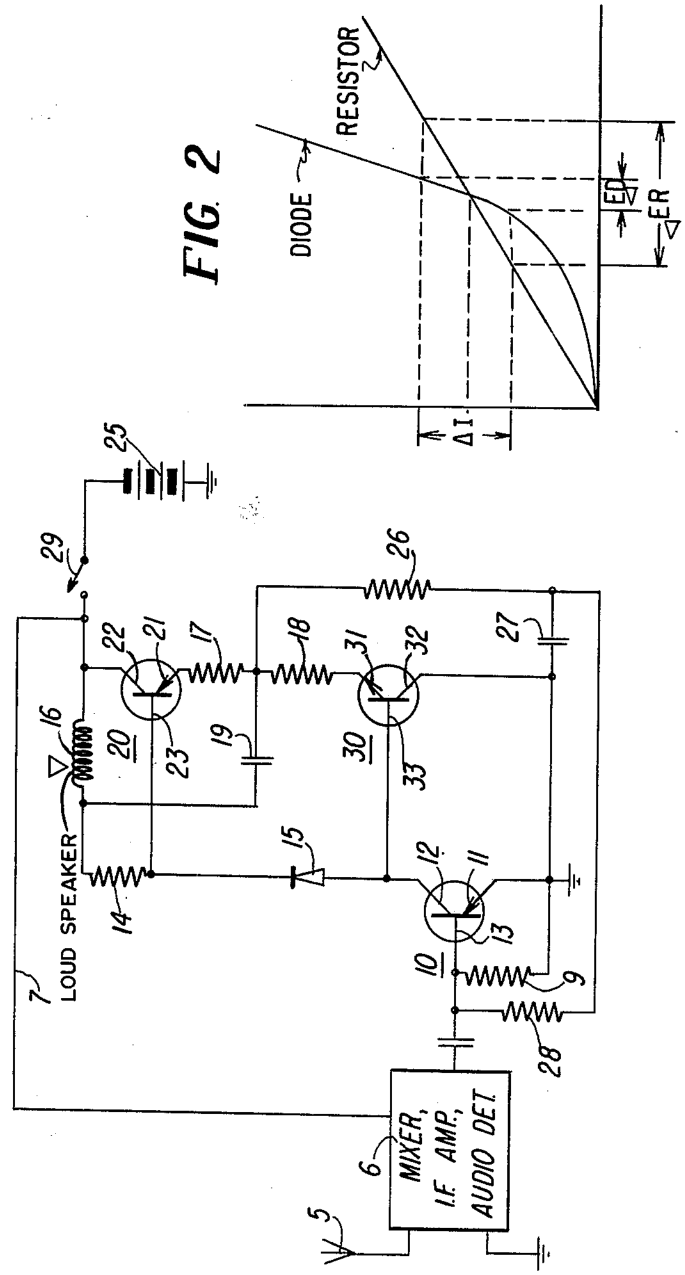

This invention relates in general to transistorized circuits and in particular to transistorized output circuits of the complementary symmetry type.

Recently the use of complementary symmetry output circuits has greatly increased. The reason for this is fairly obvious, since in such a circuit the need for an output transformer is eliminated and consequently, the circuit is not only more economical than its transformer counterpart, but is generally productive of better audio fidelity.

The invention is directed toward improving the performance of complementary symmetry output circuits. The very slight additional cost of the resultant improved circuit is more than compensated by the extended useful life of the batteries used therewith. One of the major problems encountered in the use of such circuits is the effect of a decrease in supply voltage upon its performance characteristics. Since circuits of this type are exceptionally well suited for radio receivers of the portable type, inferior performance under low battery voltage conditions reduces the useful life of the battery and adds to the customer's maintenance cost as well as necessitates more frequent battery replacement.

The invention therefore has as one of its objects to provide a circuit for prolonging the useful battery life of a portable radio receiver by utilizing a compensating diode in the load circuit of the driver transistor, which compensating diode serves to maintain substantially constant bias on the complementary symmetry connected output transistors, despite wide variations in battery potential.

An added advantage is obtained by use of the invention since the compensating diode replaces a bias resistor which is normally required in the driver transistor load circuit.

Another advantage obtained with the invention is that the current transfer ratio (beta) characteristic of the driver transistor need not be as carefully controlled as is the case where no compensating diode is used. Thus, the use of the invention facilitates mass production of equipment incorporating complementary symmetry circuits.

Accordingly, another object of this invention is to provide a complementary symmetry circuit which imposes less stringent beta requirements on the driver transistor.

A still further advantage obtained by the use of the compensating diode is that at low battery voltages, signal clipping in the output transistors remains substantially symmetrical with the result that the intelligibility of the audio output is maintained over a wider range of source voltages.

A further object of this invention is to provide a novel complementary symmetry output circuit which performs well under low voltage conditions.

Other objects and advantages of this invention will become apparent upon reading the following specification in conjunction with the drawing in which FIG. 1 is a partial block-partial schematic diagram of a radio receiver utilizing the invention and FIG. 2 is a graph indicating the relative performance characteristics of a resistor and a compensating diode in providing bias for the output transistors.

Referring now to the drawing, in FIG. 1 there is shown an antenna 5 for receiving transmitted radio frequency waves containing audio information as modulations thereof. The antenna is coupled to a block 6 which is indicated as including a mixer, an I.F. amplifier, and an audio detector. The items in block 6 are not detailed since they are conventional and well known in the art.

A source of D.C. potential 25, which in the drawing comprises a battery, is coupled to the receiver through a switch 29. Lead 7 connects source 25 to block 6 wherein circuitry (not shown) is provided for developing proper operating potentials for the elements enumerated therein. A pair of output transistors 20 and 30 of opposite conductivity types are shown connected in a complementary symmetry arrangement. As shown in the drawing, transistor 20 is of the PNP type and has an emitter 21, a collector 22 and a base 23. Transistor 30 is of the NPN type and has an emitter 31, a collector 32, and a base 33. Emitter 21 is connected to emitter 31 through a pair of emitter stabilizing resistors 17 and 18. A load 16, indicated as a loudspeaker in the drawing, has one terminal connected to the ungrounded (negative) terminal of source 25. The other terminal of loudspeaker 16 is connected through a large capacitor 19 to the junction of resistors 17 and 18 and to one terminal of a resistor 14. The other terminal of resistor 14 is connected to base 23 of transistor 20 and through compensating diode 15 to base 33 of transistor 30.

A driver transistor 10 having an emitter 11, a collector 12, and a base 13 is connected with its emitter connected to ground and its collector connected to the junction of the base of transistor 30 and compensating diode 15. Base 13 of driver transistor 10 is fed a detected audio signal from block 6. A biasing circuit for transistor 10, including resistors 9 and 28, is also provided.

The circuit is adjusted such that the potential between the junction of resistors 17 and 18 and ground is equal to one-half of the source voltage. The bias for transistor 10 may be obtained in many different ways, the bias for the circuit of the drawing being derived from the junction of resistors 17 and 18, through resistor 26 and to the voltage divider arrangement of resistors 28 and 9. Capacitor 27 serves to decouple any A.C. signal which may be present at the junction of the emitter stabilizing resistors. The particular biasing arrangement shown is utilized since it also provides a degree of temperature compensation for the circuit.

In operation, transistor 10 draws a certain collector-emitter idling current which flows from source 25, through load 16, through resistor 14 and compensating diode 15. Thus, a voltage drop is developed across diode 15 (which is forward biased), which drop is communicated to the respective bases 23 and 33 of transistors 20 and 30. Under no signal conditions, both transistors 20 and 30 are conducting substantially equal load currents. During positive excursions of the input signal to transistor 10, its collector-emitter current decreases and consequently, the potential at base 23 swings more negative, thus, allowing increased conduction in transistor 20. At the same time, the potential at the base 33 of transistor 30 swings in the negative direction which has the effect of cutting transistor 30 off. During negative excursions of the input signal to transistor 10, increased current flows in its collector-emitter circuit and consequently, the base potentials of transistors 20 and 30 are driven in a positive direction. This positive change in base potential results in transistor 20 being cut off and transistor 30 being driven more heavily.

During conduction of transistor 30, the output signal current path is as follows: from source 25, through switch 29, through loudspeaker 16, through capacitor 19, through emitter resistor 18, and through emitter 31 and collector 32 of transistor 30 to ground. During conduction of transistor 20, the output signal current path is as follows: from capacitor 19, which acts as the voltage source, through emitter resistor 17, through emitter 21 and collector 22 of transistor 20, and through loudspeaker 16 back to capacitor 19. Thus, the input signal is amplified and coupled to the loudspeaker.

The effect of the compensating diode 15 will now be described. In a normal complementary symmetry circuit an ordinary resistor is used in the place of compensating diode 15. This resistor is selected, in conjunction with the beta characteristics of driver transistor 10, to provide proper operating bias for the output transistors. Referring to FIG. 2, there is shown a pair of curves, one labelled "resistor" and the other labelled "diode." The ordinate of these curves represents the direct current in the collector-emitter circuit of transistor 10, or more exactly, the direct current through the compensating diode or bias resistor, depending upon which is used. The abscissa represents the voltage across the compensating diode or bias resistor. The curve for the resistor is seen to be a straight line which indicates a linear relationship between voltage across it and current through it, whereas, the curve for the diode indicates the nonlinear relationship between its voltage and current. Assuming that the intersection of these curves is selected as the normal idling current condition for the driver transistor, the effect of changes in supply voltage may be visualized for the case of the compensating diode and for the case of the bias resistor. With the bias resistor, the change in D.C. potential across the resistor is directly proportional to the change in direct current through it. Thus, a reduction in supply voltage results in reduced bias. However, with the compensating diode, the change in D.C. voltage across the diode is substantially independent of the change in direct current through it. Consequently, the bias at the bases of transistors 20 and 30 is held substantially constant for a wide range of idling currents drawn by the driver transistor. Thus, to state the proposition another way, the bias for the output transistors is substantially independent of fluctuations in supply voltage. With a bias resistor, the bias on the respective bases of the output transistors varies substantially with changes in driver transistor idling current and gives rise to the deleterious effects mentioned previously. As will be obvious to those skilled in the art, the maintenance of proper bias on the output transistors is essential to prevent "cross-over distortion," which is very objectionable to the listener.

It should be apparent, of course, that the compensating diode must be selected to have characteristics which are compatible with the circuit parameters used. If the compensating diode characteristics are properly chosen, the effective useful life of a conventional 6 volt battery may be extended down to approximately 2.8 volts before objectionable distortion in the output signal occurs. With prior art circuits using a bias resistor the useful life of the battery ended when its terminal voltage reached approximately 4.5 volts.

What has been described above is a novel arrangement comprising a compensating diode in the driver transistor load circuit for a complementary symmetry output circuit, which not only enhances the performance of the output circuit, but greatly extends the useful life of the battery source. It is contemplated that numerous modifications and departures from the circuit shown may be made by those skilled in the art without departing from the true spirit and scope of the invention as set forth in the appended claims.

What is claimed is:

1. In a complementary symmetry audio output system including an NPN and a PNP transistor having emitter electrodes connected together and collector electrodes connected across a direct current power source; a load impedance connected to one terminal of said power source; a driver transistor having a collector electrode connected to the base electrode of said NPN transistor and an emitter electrode connected to the other terminal of said power source; a bias circuit comprising a resistor and a compensating diode serially connected between said load and said collector of said driver transistor; the base electrode of said PNP transistor being connected to the junction of said resistor and said diode; and a capacitor coupled between the junction of said resistor and said load and the junction of said emitter electrodes; said diode possessing a steep forward biased voltage-current characteristic whereby the bias for said NPN and said PNP transistors is substantially unaffected by variations in the potential of said power source and by the beta characteristics of said driver transistor.

2. In combination; a pair of transistors of opposite conductivity types each having an emitter electrode, a collector electrode, and a base electrode; a source of direct current potential coupled across the collectors of said transistors; a pair of stabilization resistors serially connected between the emitters of said transistors; a driver transistor having a collector electrode, an emitter electrode and a base electrode; a series circuit connected from one terminal of said source of direct current potential to the collector of said driver transistor; the emitter of said driver transistor being connected to the other terminal of said source of direct current potential; said series circuit including a loudspeaker load impedance and a voltage regulating diode; an electrolytic capacitor coupled between the junction of said pair of stabilization resistors and a point between said loudspeaker load impedance and said diode; said base electrodes of said pair of transistors being connected respectively to opposite terminals of said diode whereby the bias on said pair of transistors is maintained substantially constant despite wide variations in the potential of said potential source and variations in the idling current of said driver transistor.

3. In a complementary symmetry audio output system including an NPN and a PNP transistor having emitter electrodes connected together and collector electrodes connected across a direct current power source; a load impedance connected to one terminal of said power source; a driver transistor having a collector electrode connected to the base electrode of said NPN transistor and an emitter electrode connected to the other terminal of said power source; an electrolytic capacitor connected between said load impedance and the junction of said emitter electrodes; a load circuit for said driver transistor, said load circuit comprising a serially connected resistor and a voltage compensating diode; the bases of said NPN and PNP transistors being connected to respective terminals of said diode whereby the voltage drop across said diode, due to idling-current in said driver transistor, establishes the bias for said NPN and PNP transistors; said diode being selected to have a forward bias voltage-current characteristic such that large changes in current through the diode produce relatively small changes in voltage drop across the diode, whereby the bias for said NPN and PNP transistors is held substantially constant for variations in supply voltage and variations in driver transistor idling current.

References Cited in the file of this patent

UNITED STATES PATENTS

| | | |
|---|---|---|
| 2,860,195 | Stanley | Nov. 11, 1958 |
| 2,950,346 | Freedman et al. | Aug. 23, 1960 |
| 2,955,257 | Lindsay | Oct. 4, 1960 |
| 2,955,258 | Wheatley | Oct. 4, 1960 |
| 3,075,152 | Izumi et al. | Jan. 22, 1963 |